Nov. 19, 1940.  C. C. MAURER  2,222,110
TESTER
Filed May 22, 1939
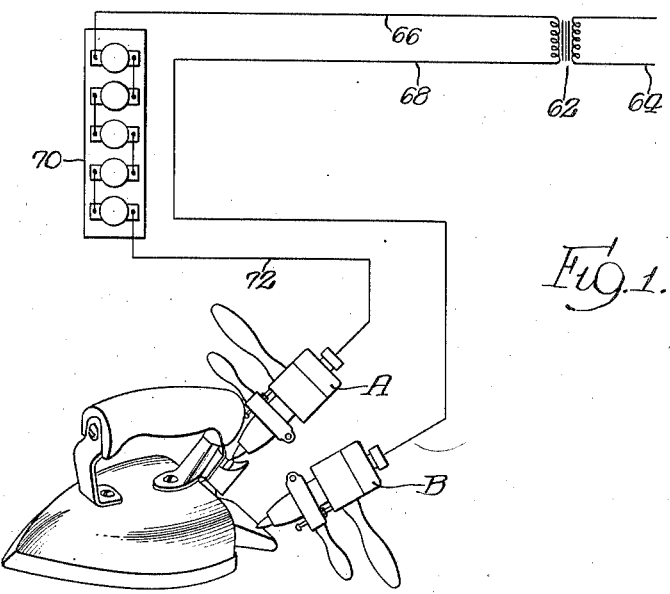
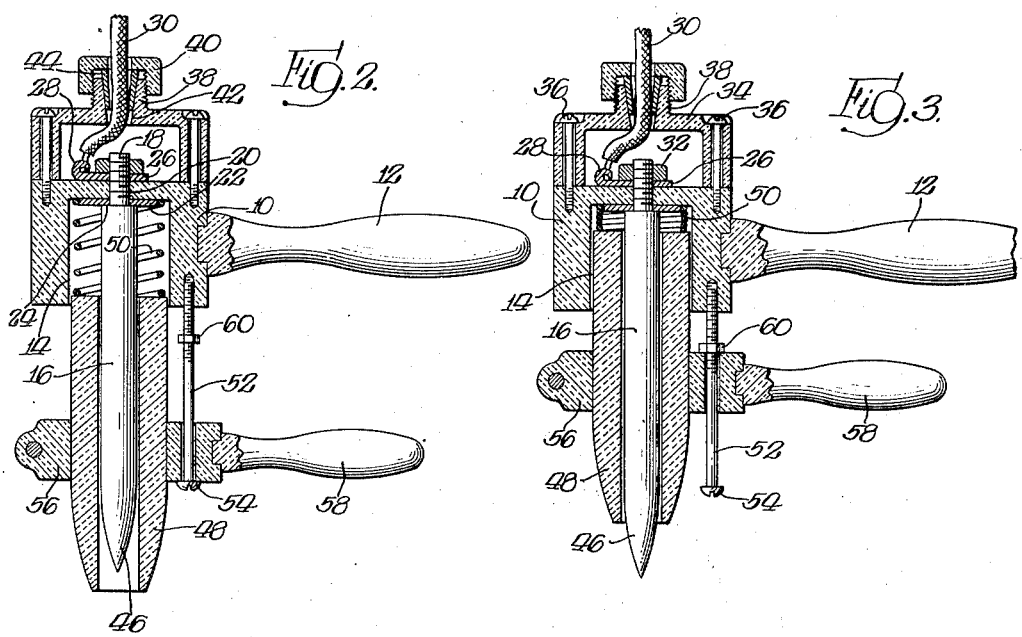
INVENTOR.
Charles C. Maurer,
BY Bair & Freeman
ATTORNEYS.

Patented Nov. 19, 1940

2,222,110

UNITED STATES PATENT OFFICE 2,222,110

TESTER

Charles Calvin Maurer, Dover, Ohio, assignor to Knapp-Monarch Company, St. Louis, Mo., a corporation of Missouri Application May 22, 1939, Serial No. 275,026

2 Claims. (Cl. 173—273)

My invention has reference to that class of devices utilized for testing electrical appliances for continuity of internal circuits and for testing the same appliances to detect any breakdown or failure of insulation between the internal circuits and the case, shell or other conducting portions of the appliance.

An object of my invention is to provide an electrode or test prod structure for a high voltage test circuit in which the live electrode shall be automatically shielded when not in use.

A further object is to provide such a structure whereby the user is protected from accidental contact with members carrying high voltage.

Still a further object is to provide such a test prod structure which cannot come into accidental electrical contact with conducting materials on the test bench or with another similar test prod when not in use.

Another object is to provide a shielded test prod in which the electrode is easily and conveniently exposed when the tester is picked up for use.

Another object is to provide such a structure in which the projection of the electrode from the shielding sleeve is effected by the normal operation of grasping the structure for use, the degree of projection being adjustable.

Another object is to provide such a structure with a grip for the connecting cable which will relieve the connection of the cable to the electrode from mechanical strains which might occur in the use of the device.

Still a further object is to provide such a device that will be simple, fool proof and economical to manufacture.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view showing two of my testers as used in testing the insulation in an ordinary electric sad iron. The testing circuit is shown diagrammatically.

Figure 2 is a vertical longitudinal sectional view through one of my testers showing the parts in the non-operative position; and Figure 3 is a view similar to Figure 2, but showing the parts in operative position.

On the accompanying drawing I have used the reference numeral 10 to indicate a body element which is preferably formed of suitable insulating material, such as fiber or Bakelite. To the body 10 I attach a handle 12 by any suitable means. In the body 12 I form a recess 14. An electrode 16 formed of any suitable electrical conducting material, such as brass, has at one end an extended threaded portion 18 of smaller diameter than the main body of the electrode 16. This threaded portion is passed through a hole 20 in the body 10. A washer 22 is interposed between the shoulder 24 on the electrode 16 and the bottom of the recess 14. On the opposite side of the body member 10, I provide a washer 26 which may have a solder lug portion 28 to receive the connecting cable 30. The assembly of electrode 16, washer 22 and washer 26 is maintained in position with reference to the body 10 by a nut 32 screwed on to the end of the threaded portion 18 of the electrode 16.

To protect the current carrying parts at this point from accidental contact, I provide the cap 34 which fits over the top side of the body member 10 and is fastened thereto by screws 36 extending through the cap 34 and engaging the body 10.

Since a test prod structure of this kind must give trouble-free service even though it undergoes much handling, I provide a cable grip means for taking any strain on the connecting cable 30 which might otherwise tend to break or weaken the soldered connection to the lug portion 28. The cable grip means consists of an annular upstanding portion 38 of the cap 34. The annular portion 38 is threaded externally to receive a cap nut 40. A tapered opening 42 receives a cable engaging sleeve 44 which is preferably formed of insulating material and split lengthwise. The upper end of the sleeve 44 is engaged by the cap nut 40 and when the cap nut 40 is screwed down, the sleeve 44 is forced into the more constricted portion of the tapered hole 42 and caused to engage the cable 30.

The free end of the electrode 16 may be pointed as at 46 and surrounding the pointed end I provide a sleeve 48 preferably formed of insulating material. One end of the sleeve 48 is received in the recess 14 of the body 10. Interposed between the bottom of the recess 14 and the sleeve 48 is a spring 50 which tends to force the sleeve 48 out of the recess 14 to enclose the end 46 of the electrode 16. The movement of the sleeve 48 in this direction is limited by a stop screw 52 threadably mounted in the body 10 and having a head 54. A clamp 56 is affixed to the sleeve 48 and provided with a suitable handle 58. The screw 52 passes through the clamp 56 and engagement of the head 54 with the clamp 56 limits the movement of the sleeve 48 in response to the force exerted by the spring 50.

When my tester is picked up for use, both handle 12 and handle 58 are gripped by the user and squeezed together, with the result that the sleeve 48 is retracted into the recess 14 against the force of the spring 50, and the pointed end 46 of the electrode 16 is exposed for contact as necessary in the testing operation.

The degree of exposure of the pointed end 56 can be regulated by a nut 60 on the screw 52 as will appear from Figure 3 of the drawing, in which the parts of my device are shown in the positions which they occupy when the tester is gripped by the user.

Figure 1 illustrates more completely the way in which my device is employed. I use two testers of the kind which I have described, in connection with a circuit including a step-up transformer 62 which is connected to any suitable source of alternating current as at 64. The transformer has a ratio such that a voltage of perhaps five hundred or one thousand volts appears across the conductors 66 and 68. In one of these conductors I introduce an indicating device, which may be a bank of lamps connected in series, as at 70. One tester is connected to a lead 72 from the lamp bank and the other tester is connected to the lead 68.

In Figure 1, the tester indicated by A is applied to one of the connector terminals of an ordinary electric sad iron. The other tester indicated as B, is applied to a portion of the metal shell of the iron, in this case the rest. If there is any breakdown or failure of the insulation between the heating element of the iron and the shell, the lamp bank 70 will light up. If the insulation is satisfactory, the lamps will not light.

I can test the continuity of the internal circuit of an electrical device or appliance by applying one tester to one of the terminals and the other tester to a second terminal. If the internal circuit, such as a heating element, in the device is complete, the lamps at 70 will light, but if there should be an "open" in the internal circuit, the lamps will not light.

My device is very useful for production testing of household electrical appliances in a factory where it is essential that the test must be made easily and speedily. Yet my device provides means whereby the high voltage necessary for a reliable insulation test can be employed with a minimum of hazard to the employees conducting the test and with a minimum of danger of injury, fire or other accident occurring from inadvertent contact between two high voltage test prods on the work bench.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A test prod comprising a support, hand grip means formed thereby, a contact element fixed with reference to said support, an insulating member enclosing said contact element and slidable relative thereto, a spring interposed between said support and said insulating member, and adjustable stop means for limiting the extent of compression of said spring, said means including a member extending from said support parallel to said contact element, a stop element selectively adjustable along said last member, and a projection from said insulating member engageable with said stop element when said insulating member is moved toward said support.

2. In a device of the class described, a body member, a contact electrode mounted therein, an insulating sleeve surrounding said electrode, means for urging said sleeve to a position enclosing the tip of said electrode, a handle carried by said body member, a handle carried by said insulating sleeve, said handles being so arranged relative to each other that they can be simultaneously gripped in the hand of a user of the device and thereby propelled relatively toward each other to effect movement of said sleeve to a position exposing the tip of said electrode, means for retaining said sleeve in engagement with said electrode comprising a headed bolt passing slidably through the handle on said sleeve and threadedly engaging said body member, the head of said bolt limiting movement of said sleeve away from said body member, and a stop member longitudinally adjustable on said bolt between said body member and the handle on said sleeve.

CHARLES CALVIN MAURER.